US012700375B2

(12) United States Patent
Ju et al.

(10) Patent No.: US 12,700,375 B2
(45) Date of Patent: Aug. 4, 2026

(54) SOURCE DRIVE CHIP HAVING A POWER SUPPLY CIRCUIT AND DISPLAY APPARATUS

(71) Applicant: Huawei Technologies Co., Ltd., Shenzhen (CN)

(72) Inventors: Dongqian Ju, Shanghai (CN); Wei Hsiang Hung, Shenzhen (CN); Chuan Che Lee, Shenzhen (CN); Shengchao Wang, Shenzhen (CN); Shipeng Chi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/022,543

(22) Filed: Jan. 15, 2025

(65) Prior Publication Data

US 2025/0157417 A1 May 15, 2025

Related U.S. Application Data

(63) Continuation of application No. PCT/CN2023/112686, filed on Aug. 11, 2023.

(30) Foreign Application Priority Data

Aug. 19, 2022 (CN) ........................ 202210997034.7
Feb. 14, 2023 (CN) ........................ 202310161437.2

(51) Int. Cl.
*G09G 3/3275* (2016.01)

(52) U.S. Cl.
CPC ..... *G09G 3/3275* (2013.01); *G09G 2330/021* (2013.01)

(58) Field of Classification Search
CPC ................................................... G09G 3/3275
(Continued)

(56) References Cited

U.S. PATENT DOCUMENTS 8,618,786 B1 12/2013 Perisetty et al.
9,225,234 B2 12/2015 Ku et al.
(Continued)

FOREIGN PATENT DOCUMENTS

CN 104777869 A 7/2015
CN 110070815 A 7/2019

OTHER PUBLICATIONS

Ixys: "3-Terminal Negative Voltage Regulator-EEWeb", Aug. 6, 2014, total 10 pages.
(Continued)

*Primary Examiner* — Long D Pham
(74) *Attorney, Agent, or Firm* — Conley Rose, P.C.

(57) ABSTRACT

A source drive include a power supply circuit that includes a charge pump, a reference source generation circuit, and a low-dropout (LDO) regulator. The charge pump includes at least two on-chip capacitors, is coupled to the reference source generation circuit, and is configured to provide a negative voltage level for the reference source generation circuit based on an external positive voltage power supply. The reference source generation circuit is coupled to the LDO regulator. The reference source generation circuit is configured to provide a reference voltage for the LDO regulator based on the negative voltage level. The LDO regulator is coupled to a load circuit, and the LDO regulator is configured to output a power supply voltage to the load circuit based on the reference voltage and an external negative voltage power supply.

20 Claims, 7 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 2007/0262757 | A1* | 11/2007 | Kawagoshi | H02M 1/10 323/265 |
| 2008/0284498 | A1 | 11/2008 | Xu et al. | |
| 2010/0109624 | A1 | 5/2010 | Lourens et al. | |
| 2018/0234056 | A1* | 8/2018 | Sun | H03F 1/0205 |
| 2020/0209298 | A1* | 7/2020 | Büthker | F21S 41/141 |
| 2020/0264644 | A1* | 8/2020 | Inoue | B60R 16/03 |
| 2021/0375209 | A1* | 12/2021 | Han | G09G 3/3258 |
| 2023/0025117 | A1* | 1/2023 | Kim | G05F 1/565 |

OTHER PUBLICATIONS

Anonymous Jon et al: "The Interleaved Inverting Charge Pump—Part 1: A New Topology for Low Noise Negative Voltage Supplies | Analog Devices", Nov. 30, 2020, total 16 pages.

* cited by examiner

SOURCE DRIVE CHIP HAVING A POWER SUPPLY CIRCUIT AND DISPLAY APPARATUS

CROSS-REFERENCE TO RELATED APPLICATIONS

This is a continuation of International Patent Application No. PCT/CN2023/112686, filed on Aug. 11, 2023, which claims priority to Chinese Patent Application No. 202210997034.7, filed on Aug. 19, 2022 and Chinese Patent Application No. 202310161437.2, filed on Feb. 14, 2023. All of the aforementioned patent applications are hereby incorporated by reference in their entireties.

TECHNICAL FIELD

This disclosure relates to the field of display technologies, and in particular, to a source drive chip and a display apparatus.

BACKGROUND

For a source drive chip used in a display like an organic light-emitting diode (OLED) display, an external power supply generally provides only an extremely low negative voltage power supply (VGL) (−12 volts (V)). In this case, to supply power to a negative voltage module inside the source drive chip, a medium-voltage negative voltage power supply (−6 V) usually needs to be generated inside the source drive chip to ensure that a medium-voltage component (whose withstand voltage is 8 V) can be selected as the negative voltage module inside the source drive chip, and a high-voltage component (whose withstand voltage is 32 V) is avoided. Selecting the medium-voltage component can reduce a layout area and power consumption of the source drive chip.

A charge pump (CP) with an off-chip capacitor can be used to convert a positive voltage power supply of +8 V to a negative voltage power supply of −6 V through a voltage conversion function of a low-dropout (LDO) regulator. According to such a solution, a CP structure occupies space of the off-chip capacitor at a panel level. This increases costs of the chip. A new power supply circuit in the source drive chip can reduce a quantity of off-chip capacitors at the panel level, so as to reduce costs of the chip and improve competitiveness of the chip.

SUMMARY

This disclosure provides a source drive chip and a display apparatus to reduce costs of the chip.

According to a first aspect, this disclosure provides a source drive chip, and the source drive chip may include a power supply circuit and a load circuit. The power supply circuit may include a charge pump, a reference source generation circuit, and a low dropout regulator. At least two capacitors included in the charge pump are changed from off-chip capacitors to on-chip capacitors. The charge pump is coupled to the reference source generation circuit. The charge pump is configured to provide a negative voltage level for the reference source generation circuit based on an external positive voltage power supply. The reference source generation circuit is coupled to the low dropout regulator. The reference source generation circuit is configured to provide a reference voltage for the low dropout regulator based on the negative voltage level. The low dropout regulator is coupled to the load circuit, and the low dropout regulator is configured to output a power supply voltage to the load circuit based on the reference voltage and an external negative voltage power supply.

In the source drive chip provided in this disclosure, a circuit structure in the power supply circuit is adjusted. The negative voltage level generated by the charge pump is provided only for the reference source generation circuit to generate the required reference voltage, and the negative voltage level generated by the charge pump does not need to be provided for the low dropout regulator. In other words, the negative voltage level is no longer used as a negative voltage power supply of the low dropout regulator. A power supply of the low dropout regulator is adjusted, and a voltage of the external negative voltage power supply is fully used. The negative voltage power supply of the low dropout regulator may be directly provided by the external negative voltage power supply. In this way, a power supply capability required by the charge pump can be reduced, and currents flowing through the charge pump can be reduced. This avoids generation of a large inrush current in a power-on process, and ensures safety of the circuit. In addition, a circuit structure of the charge pump may be optimized. On the premise that use and performance of the circuit are not affected, the at least two capacitors included in the charge pump are changed from off-chip capacitors to on-chip capacitors with small capacitance values. This reduces panel-level costs of the off-chip capacitors, reduces costs of the chip, and improves competitiveness of the chip.

In the power-on process of the power supply circuit provided in this embodiment of this disclosure, the charge pump first works, and generates the negative voltage level required by the reference source generation circuit. Then, the reference source generation circuit generates the reference voltage and inputs the reference voltage to the low dropout regulator. Finally, the low dropout regulator generates a stable power supply voltage to supply power to a next-stage load circuit. The power supply circuit provided in this disclosure can provide a stable power supply, and implement voltage conversion. In addition, costs of the chip can be further reduced.

For example, the power supply voltage is generally a negative voltage whose voltage value is higher than a voltage value of the external negative voltage power supply, so that a high-voltage component (whose withstand voltage is 32 V) can be avoided in the load circuit. For example, the power supply voltage may be about −6 V, and the external negative voltage power supply may be −12 V.

In this embodiment, a plurality of medium-voltage components may be selected for the load circuit, and a withstand voltage of the medium-voltage component is generally not greater than 8 V. This reduces a layout area of the chip. When the source drive chip provided in this embodiment is used in an OLED display apparatus, the load circuit may be an on-screen initialization voltage power supply system.

In the power supply circuit provided in this disclosure, the charge pump may also be referred to as a capacitive switching voltage regulator, a switched-capacitor direct current (DC) (DC-DC) converter, or a non-inductive DC-DC converter. The charge pump generally uses a capacitor as a switch element and an energy storage element. The charge pump used in the source drive chip provided in this embodiment may have a plurality of circuit structures. For example, the charge pump may be a back-pressure charge pump. The charge pump may include a first on-chip capacitor, a second on-chip capacitor, a first switch, a second switch, a third switch, and a fourth switch. One end of the first on-chip capacitor may be coupled to the external positive voltage power supply through the first switch, and the other end of the first on-chip capacitor may be grounded through the third switch. One end of the second on-chip capacitor may be connected in series to the second switch and coupled to one end of the first on-chip capacitor, and the end of the second on-chip capacitor is grounded, and the other end of the second on-chip capacitor may be connected in series to the fourth switch and coupled to the other end of the first on-chip capacitor, and the other end of the second on-chip capacitor is configured to provide the negative voltage level, that is, the other end of the second on-chip capacitor is coupled to the reference source generation circuit. Capacitance values of the first on-chip capacitor and the second on-chip capacitor are controlled to be at a nanofarad (nF) level and a picofarad (pF) level. Generally, a requirement for transmitting a current signal can be met when a capacitance value is less than 10 nF. This can reduce costs in comparison with a microfarad (mF)-level off-chip capacitor.

An example of a working process of the charge pump is as follows. In a first phase, the first switch and the third switch are turned on, the second switch and the fourth switch are turned off, and the external positive voltage power supply charges the first on-chip capacitor. In this case, a potential of the first on-chip capacitor is as follows. An end coupled to the first switch is a high potential, and an end coupled to the third switch is a low potential. In a second phase, the first switch and the third switch are turned off, the second switch and the fourth switch are turned on, and the first on-chip capacitor is in a discharging state. In this case, a voltage of the first on-chip capacitor does not change. Because one end that is of the second on-chip capacitor and that is coupled to the high potential of the first on-chip capacitor through the second switch is grounded, the other end of the second on-chip capacitor provides a negative voltage level. A value of the negative voltage level is related to parameters of the external positive voltage power supply, the first on-chip capacitor, and the second on-chip capacitor. When the first on-chip capacitor is approximately equal to the second on-chip capacitor, for example, when the external positive voltage power supply is +8 V, the negative voltage level is −8 V.

In an embodiment, because the first switch and the third switch are both turned on or off, control ends of the first switch and the third switch may be controlled by a same control signal. Similarly, because the second switch and the fourth switch are both turned on or off, control ends of the second switch and the fourth switch may be controlled by a same control signal.

In the power supply circuit provided in this disclosure, the low dropout regulator may also be referred to as a low dropout linear regulator or a low dropout regulator, is a type of linear direct current regulator, and is used to provide a stable direct current voltage power supply. Compared with a general linear direct current regulator, the low dropout regulator can work with a smaller output input voltage difference. The low dropout regulator used in the source drive chip provided in this embodiment may have a plurality of circuit structures. The low dropout regulator may include an operational amplifier, a power output transistor, a first feedback resistor, a second feedback resistor, and an output capacitor. A positive input end of the operational amplifier is configured to receive the reference voltage, a negative input end of the operational amplifier is configured to receive a feedback voltage, a negative voltage power supply end of the operational amplifier is coupled to the external negative voltage power supply, a positive voltage power supply end of the operational amplifier is grounded, and an output end of the operational amplifier is coupled to a gate of the power output transistor. A source of the power output transistor is coupled to the external negative voltage power supply, a drain of the power output transistor is grounded through a series structure of the first feedback resistor and the second feedback resistor, and the drain of the power output transistor is configured to provide the power supply voltage, that is, the drain of the power output transistor is coupled to the load circuit. A series connection point between the first feedback resistor and the second feedback resistor is configured to output the feedback voltage. One end of the output capacitor is coupled to the drain of the power output transistor, and the other end of the output capacitor is grounded.

The first feedback resistor, the second feedback resistor, and the operational amplifier may form a negative feedback loop to control a gate voltage of the power output transistor. A function of the low dropout regulator is as follows. When the power supply voltage changes, the operational amplifier feeds back and controls the gate voltage of the power output transistor to maintain the power supply voltage unchanged. When the connected load circuit jumps from a heavy load to a light load, because a current provided by the power output transistor is far greater than a load requirement, an excess current may further charge the output capacitor, so that the power supply voltage increases (in this case, overshooting of a potential of the power supply voltage occurs), and the feedback voltage increases. The output end of the operational amplifier controls the gate voltage of the power output transistor to increase, and the current provided by the power output transistor to decrease to a load current. On the contrary, when the load jumps from a light load to a heavy load, because a current provided by the power output transistor cannot meet a load requirement, a load current is discharged through the output capacitor, so that the power supply voltage decreases (in this case, undershooting of a potential of the power supply voltage occurs), and the feedback voltage decreases. The output end of the operational amplifier controls the gate voltage of the power output transistor to decrease, and the current provided by the power output transistor to increase to the load current.

Optionally, the operational amplifier may be a folded cascode operational amplifier, which has lower power consumption and a higher gain, and may separately adjust decoupling of input stage transconductance and an output impedance.

In this embodiment, the power output transistor may be a P-channel field effect transistor. When the gate voltage of the power output transistor increases, a drain voltage of the power output transistor decreases, and when the gate voltage of the power output transistor decreases, the drain voltage of the power output transistor increases.

Optionally, both the first feedback resistor and the second feedback resistor may be a polycrystalline silicon resistor, and precision is higher.

In the power supply circuit provided in this disclosure, the reference source generation circuit may be a circuit that can generate a reference voltage, like a reference voltage bandgap (BG) circuit.

According to a second aspect, this disclosure further provides a display apparatus, and the display apparatus may include the source drive chip provided in any possible design of the first aspect of this disclosure and a display panel. The display panel may be an OLED display panel.

The display apparatus provided in this embodiment may be used in various terminal devices, for example, may be used in electronic devices such as a smartphone, a tablet computer, a palmtop computer, and a personal digital assistant (PDA). It should be noted that the display apparatus provided in embodiments of this disclosure includes but is not limited to being used in these terminal devices and any terminal device of another proper type.

For technical effect that can be achieved by any possible design of the second aspect, refer to technical effect that can be achieved by any possible design of the first aspect. Details are not described herein again. These aspects or another aspect of this disclosure is clearer and more comprehensible in descriptions of the following embodiments.

BRIEF DESCRIPTION OF DRAWINGS

To describe the technical solutions in embodiments of this disclosure or in the background more clearly, the following briefly describes the accompanying drawings for describing embodiments of this disclosure.

REFERENCE NUMERALS

Figure 1:
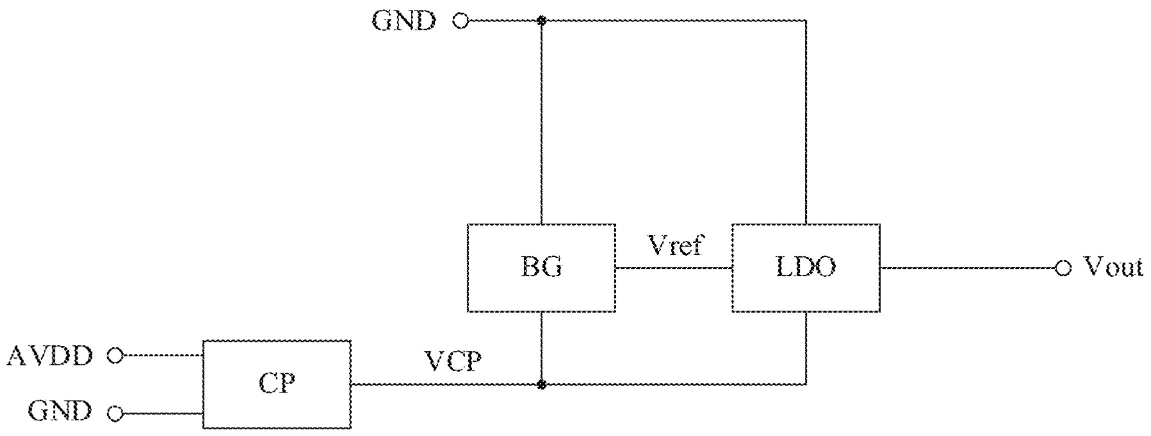
FIG. 1 is a diagram of a structure of a power supply circuit in a source drive chip.

100: power supply circuit; 200: load circuit; 110: charge pump; 120: reference source generation circuit; 130: low dropout regulator; 01: source drive chip; 02: display panel; AVDD: external positive voltage power supply; VGL: external negative voltage power supply; VCP: negative voltage level; Vref: reference voltage; Vout: power supply voltage; Vfb: feedback voltage; GND: grounded; C1: first on-chip capacitor; C2: second on-chip capacitor; C3: output capacitor; SW1: first switch; SW2: second switch; SW3: third switch; SW4: fourth switch; Op: operational amplifier; Mn: power output transistor; R1: first feedback resistor; and R2: second feedback resistor.

DESCRIPTION OF EMBODIMENTS

To make objectives, technical solutions, and advantages clearer, the following further describes this disclosure in detail with reference to the accompanying drawings.

Terms used in the following embodiments are merely intended to describe example embodiments, but are not intended to limit this disclosure. Terms "one", "a", "the", "the foregoing", and "this" of singular forms used in this specification and the appended claims of this disclosure are also intended to include expressions such as "one or more", unless the context clearly indicates to the contrary.

Reference to "an embodiment", "some embodiments", or the like described in this specification indicates that one or more embodiments of this disclosure include features, structures, or characteristics described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In addition, same reference numerals in the figures represent same or similar structures. Therefore, repeated description thereof is omitted. Expressions of locations and directions are described by using the accompanying drawings as an example. However, changes may also be made as required, and all the changes fall within the protection scope of this disclosure. The accompanying drawings are merely used to illustrate relative position relationships and do not represent an actual scale.

As shown in FIG. 1, in an existing source drive chip of an OLED, a negative voltage module required by an internal module is usually a CP with two off-chip capacitors, and a positive voltage power supply (AVDD) is used to generate a negative voltage level (VCP) with a large ripple to supply power to a BG circuit and an LDO. Then, the BG circuit generates a reference voltage Vref as an input voltage of the LDO, and outputs a high-precision power supply voltage Vout, which is usually −6 V, through the LDO as a power supply of the internal module.

Because the charge pump needs to have power supply capability to provide the VCP for both the BG circuit and the LDO circuit, to stabilize a voltage of the VCP, an off-chip capacitor with a large capacitance value needs to be used in the charge pump. When the charge pump is powered on and started, the off-chip capacitor with a large capacitance value needs to be charged. This may cause a risk of an excessive inrush current. In addition, the off-chip capacitor required by the charge pump also increases panel-level costs of the chip, and an external negative voltage power supply is not fully used.

In view of this, to avoid generating a large inrush current in the circuit, ensure safety of the circuit, and reduce costs of the chip, a power supply circuit structure in the source drive chip is improved in embodiments of this disclosure.

The following describes in detail a source driver chip and a display apparatus provided in this disclosure with reference to the accompanying drawings.

Figure 2:
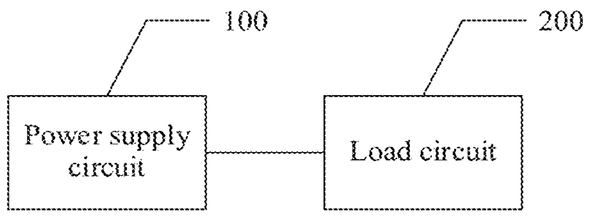
FIG. 2 is a diagram of a structure of a source drive chip according to an embodiment.
Figure 3:
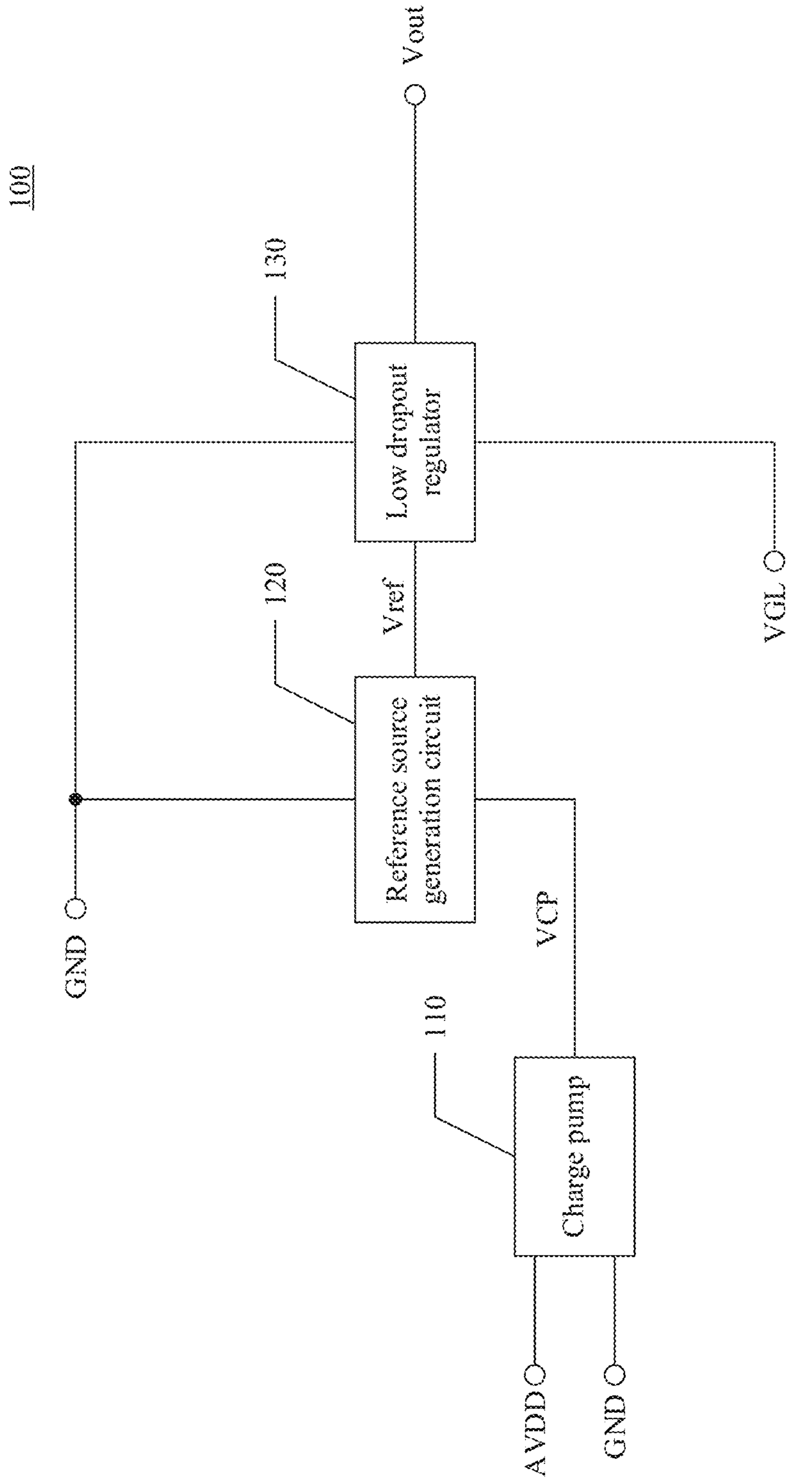
FIG. 3 is a diagram of an overall structure of a power supply circuit in a source drive chip according to an embodiment.

FIG. 2 is an example of a diagram of a structure of a source drive chip according to an embodiment. FIG. 3 is an example of a diagram of an overall structure of a power supply circuit in the source drive chip according to an embodiment.

As shown in FIG. 2, the source drive chip provided in this embodiment may include a power supply circuit 100 and a load circuit 200. As shown in FIG. 3, the power supply circuit 100 may include a charge pump 110, a reference source generation circuit 120, and a low dropout regulator 130. At least two capacitors included in the charge pump 110 are changed from off-chip capacitors to on-chip capacitors. The charge pump 110 is coupled to the reference source generation circuit 120. The charge pump 110 is configured to provide a negative voltage level VCP for the reference source generation circuit 120 based on an external positive voltage power supply AVDD. The reference source generation circuit 120 is coupled to the low dropout regulator 130.

The reference source generation circuit 120 is configured to provide a reference voltage Vref for the low dropout regulator 130 based on the negative voltage level VCP. The low dropout regulator 130 is coupled to the load circuit 200, and the low dropout regulator 130 is configured to output a power supply voltage Vout to the load circuit 200 based on the reference voltage Vref and an external negative voltage power supply VGL.

In the source drive chip provided, a circuit structure in the power supply circuit 100 is adjusted. The negative voltage level VCP generated by the charge pump is provided only for the reference source generation circuit 120 to generate the required reference voltage Vref, and the negative voltage level VCP generated by the charge pump does not need to be provided for the low dropout regulator. In other words, the negative voltage level VCP is no longer used as a negative voltage power supply of the low dropout regulator 130. A power supply of the low dropout regulator 130 is adjusted, and a voltage of the external negative voltage power supply VGL is fully used. The negative voltage power supply of the low dropout regulator 130 may be directly provided by the external negative voltage power supply VGL. In this way, a power supply capability required by the charge pump 110 can be reduced, and currents flowing through the charge pump 110 can be reduced. This avoids generation of a large inrush current in a power-on process, and ensures safety of the circuit. In addition, a circuit structure of the charge pump 110 may be optimized. On the premise that use and performance of the circuit are not affected, the at least two capacitors included in the charge pump 110 are changed from off-chip capacitors to on-chip capacitors with small capacitance values. This reduces panel-level costs of the off-chip capacitors, reduces costs of the chip, and improves competitiveness of the chip.

In the power-on process of the power supply circuit 100 provided in this embodiment, the charge pump 110 first works, and generates the negative voltage level VCP required by the reference source generation circuit 120. Then, the reference source generation circuit 120 generates the reference voltage Vref and inputs the reference voltage Vref to the low dropout regulator 130. Finally, the low dropout regulator 130 generates a stable power supply voltage Vout to supply power to the next-stage load circuit 200. The power supply circuit 100 provided can provide a stable power supply, and implement voltage conversion. In addition, costs of the chip can be further reduced.

The power supply voltage Vout is generally a negative voltage whose voltage value is higher than a voltage value of the external negative voltage power supply VGL, so that a high-voltage component (whose withstand voltage is 32 V) can be avoided in the load circuit 200. For example, the power supply voltage Vout may be about −6 V, and the external negative voltage power supply VGL may be −12 V.

In this embodiment, a plurality of medium-voltage components may be selected for the load circuit 200, and a withstand voltage of the medium-voltage component is generally not greater than 8 V. This reduces a layout area of the chip. When the source drive chip provided in this embodiment of this disclosure is used in an OLED display apparatus, the load circuit 200 may be an on-screen initialization voltage power supply system.

Figure 4:
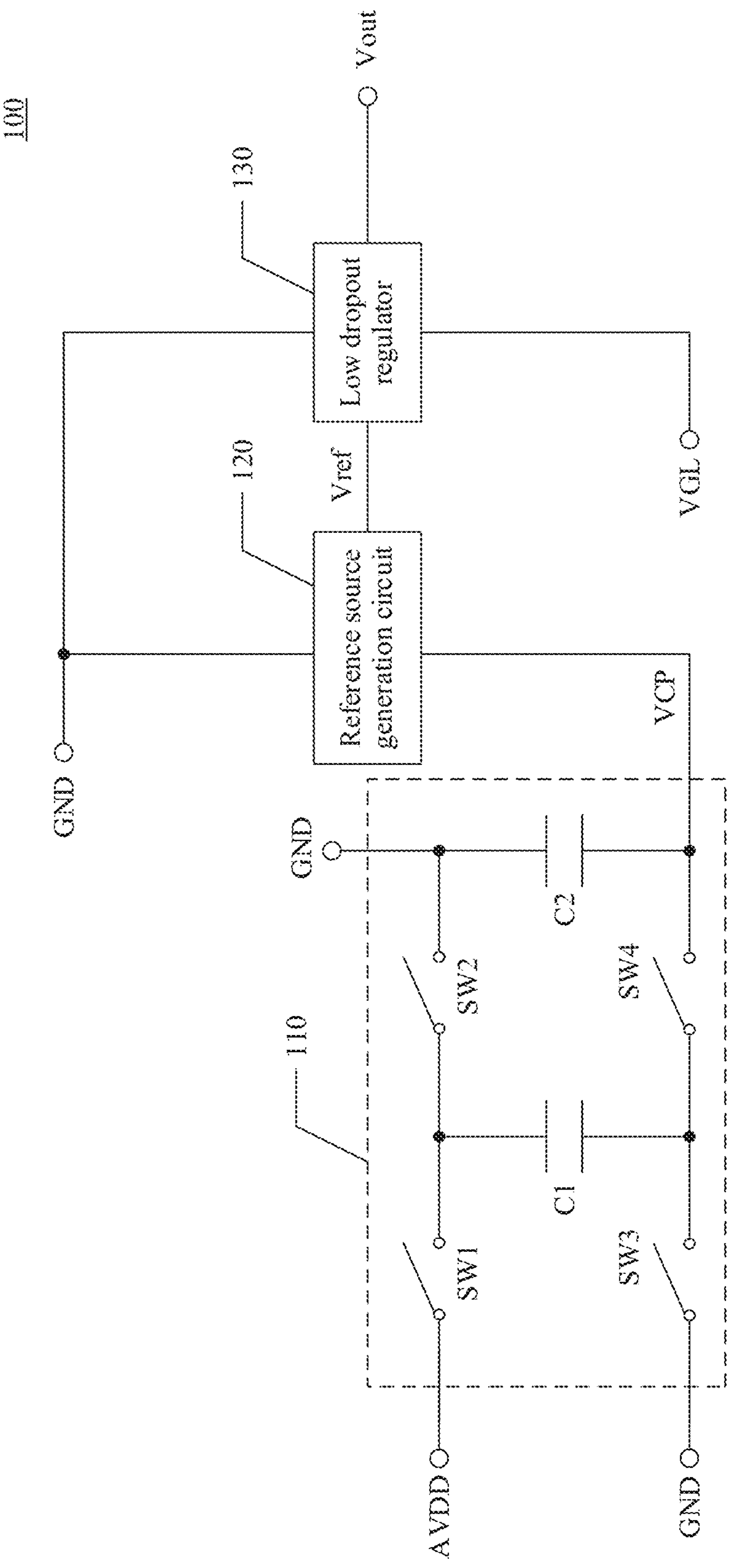
FIG. 4 is a diagram of a structure of a power supply circuit in a source drive chip according to an embodiment.

FIG. 4 is an example of a diagram of a structure of a power supply circuit in a source drive chip according to an embodiment.

In the power supply circuit 100 provided, the charge pump 110 may also be referred to as a capacitive switching voltage regulator, a switched-capacitor DC-DC converter, or a non-inductive DC-DC converter. The charge pump generally uses a capacitor as a switch element and an energy storage element. The charge pump 110 used in the source drive chip provided in this embodiment may have a plurality of circuit structures. For example, the charge pump may be a back-pressure charge pump. As shown in FIG. 4, the charge pump may include a first on-chip capacitor C1, a second on-chip capacitor C2, a first switch SW1, a second switch SW2, a third switch SW3, and a fourth switch SW4. One end of the first on-chip capacitor C1 may be coupled to the external positive voltage power supply AVDD through the first switch SW1, and the other end of the first on-chip capacitor C1 may be grounded GND through the third switch SW3. One end of the second on-chip capacitor C2 may be connected in series to the second switch SW2 and then coupled to one end of the first on-chip capacitor C1, and the end of the second on-chip capacitor C2 is grounded GND; and the other end of the second on-chip capacitor C2 may be connected in series to the fourth switch SW4 and then coupled to the other end of the first on-chip capacitor C1, and the other end of the second on-chip capacitor C2 is configured to provide the negative voltage level VCP, in other words, the other end of the second on-chip capacitor C2 is coupled to the reference source generation circuit 120. Capacitance values of the first on-chip capacitor C1 and the second on-chip capacitor C2 are controlled to be at a nanofarad level and a picofarad level. Generally, a requirement for transmitting a current signal can be met when a capacitance value is less than 10 nF. This can reduce costs in comparison with a mF-level off-chip capacitor.

Figure 5:
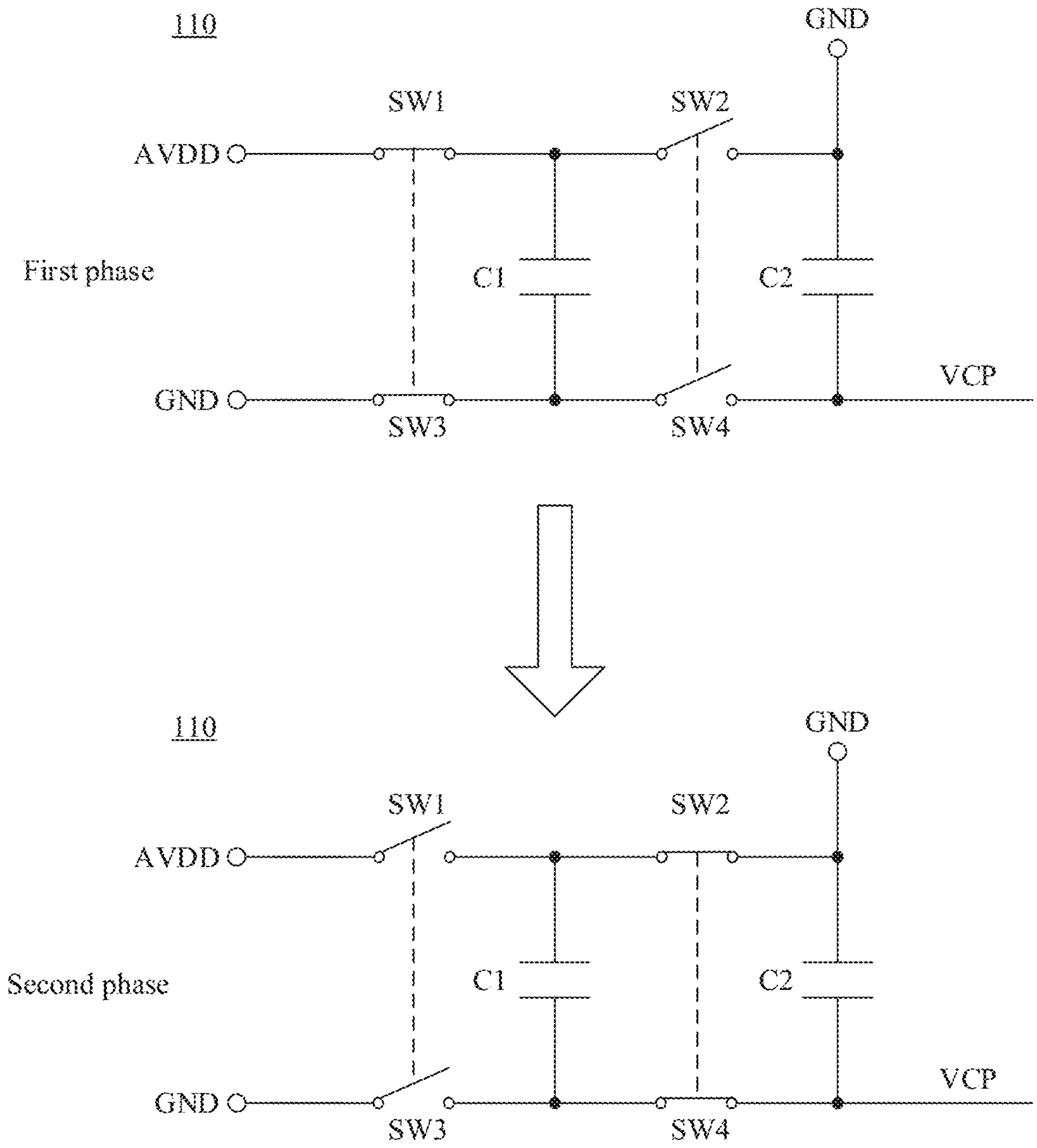
FIG. 5 is a diagram of a working principle of a charge pump in a source drive chip according to an embodiment.

FIG. 5 is an example of a diagram of a working principle of a charge pump in a source drive chip according to an embodiment.

As shown in FIG. 5, a working process of the charge pump is as follows. In a first phase, a first switch SW1 and a third switch SW3 are turned on, a second switch SW2 and a fourth switch SW4 are turned off, and an external positive voltage power supply AVDD charges the first on-chip capacitor C1. In this case, a potential of the first on-chip capacitor C1 is as follows: an end coupled to the first switch SW1 is at a high potential, and an end coupled to the third switch SW3 is at a low potential. In a second phase, the first switch SW1 and the third switch SW3 are turned off, the second switch SW2 and the fourth switch SW4 are turned on, and the first on-chip capacitor C2 is in a discharging state. In this case, a voltage of the first on-chip capacitor C1 does not change. Because one end that is of the second on-chip capacitor C2 and that is coupled to the high potential of the first on-chip capacitor C1 through the second switch SW2 is grounded GND, the other end of the second on-chip capacitor provides a negative voltage level VCP. A value of the negative voltage level VCP is related to parameters of the external positive voltage power supply VADD, the first on-chip capacitor C1, and the second on-chip capacitor C2. When the first on-chip capacitor C1 is approximately equal to the second on-chip capacitor C2, VCP=−AVDD. For example, when the external positive voltage power supply AVDD is +8 V, the negative voltage level VCP is −8 V.

In an embodiment, because the first switch SW1 and the third switch SW3 are both turned on or off, control ends of the first switch SW1 and the third switch SW3 may be controlled by a same control signal. Similarly, because the second switch SW2 and the fourth switch SW4 are both turned on or off, control ends of the second switch SW2 and the fourth switch SW4 may be controlled by a same control signal.

Figure 6:
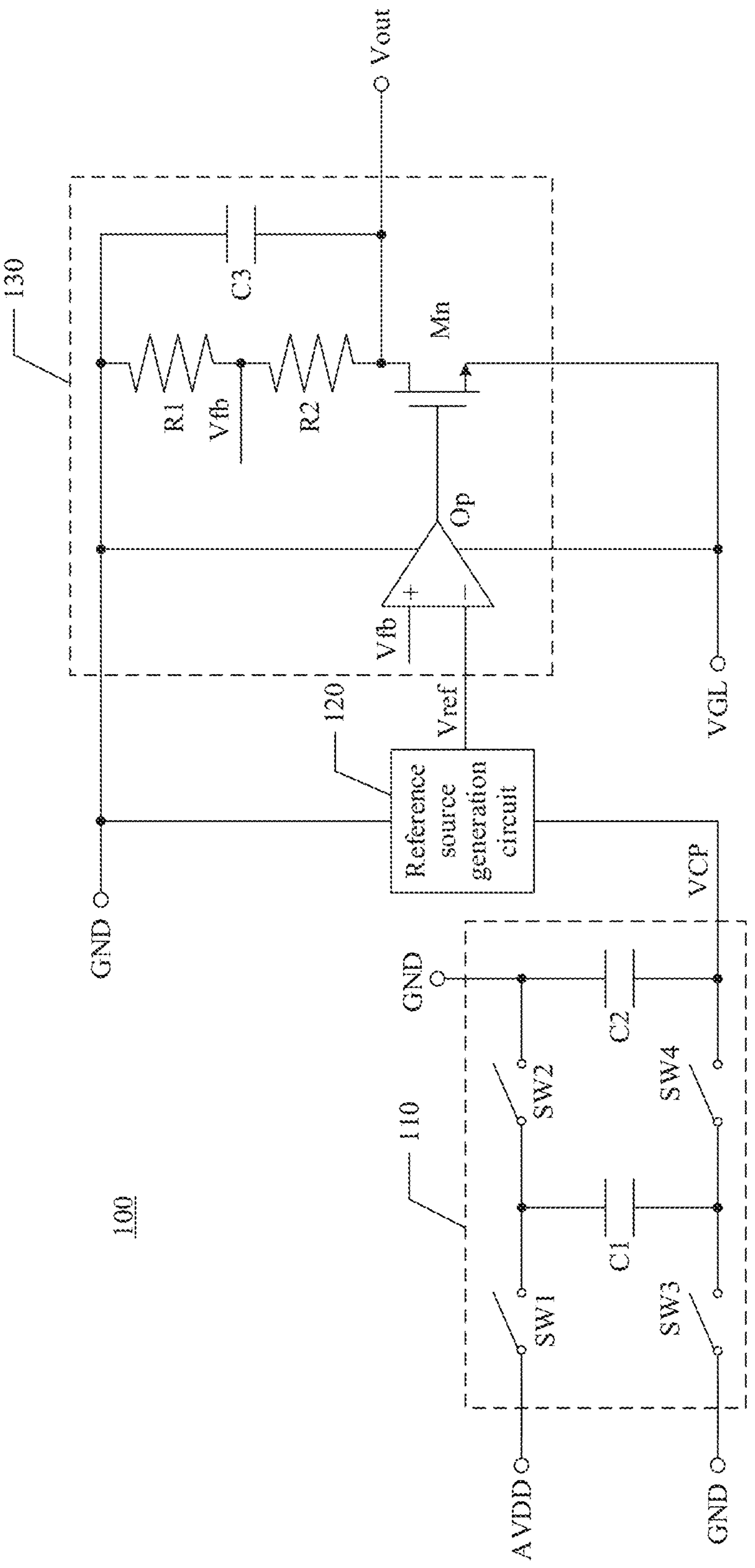
FIG. 6 is a diagram of another structure of a power supply circuit in a source drive chip according to an embodiment.

FIG. 6 is an example of a diagram of another structure of a power supply circuit in a source drive chip according to an embodiment.

In the power supply circuit 100 provided, the low dropout regulator 130 may also be referred to as a low dropout linear regulator or a low dropout regulator, is a type of linear direct current regulator, and is used to provide a stable direct current voltage power supply. Compared with a general linear direct current regulator, the low dropout regulator can work with a smaller output input voltage difference. The low dropout regulator 130 used in the source drive chip provided in this embodiment may have a plurality of circuit structures. As shown in FIG. 6, the low dropout regulator 130 may include an operational amplifier Op, a power output transistor Mn, a first feedback resistor R1, a second feedback resistor R2, and an output capacitor C3. A positive input end of the operational amplifier Op is configured to receive a reference voltage Vref, a negative input end of the operational amplifier Op is configured to receive a feedback voltage Vfb, a negative voltage power supply end of the operational amplifier Op is coupled to an external negative voltage power supply VGL, a positive voltage power supply end of the operational amplifier Op is grounded GND, and an output end of the operational amplifier Op is coupled to a gate of the power output transistor Mn. A source of the power output transistor Mn is coupled to the external negative voltage power supply VGL, a drain of the power output transistor Mn is grounded GND through a series structure of the first feedback resistor R1 and the second feedback resistor R2, and the drain of the power output transistor Mn is configured to provide a power supply voltage Vout, that is, the drain of the power output transistor Mn is coupled to a load circuit 200. A series connection point between the first feedback resistor R1 and the second feedback resistor R2 is configured to output the feedback voltage Vfb. One end of the output capacitor C3 is coupled to the drain of the power output transistor Mn, and the other end of the output capacitor C3 is grounded GND.

The first feedback resistor R1, the second feedback resistor R2, and the operational amplifier Op may form a negative feedback loop to control a gate voltage of the power output transistor Mn. A function of the low dropout regulator is as follows. When the power supply voltage Vout changes, the operational amplifier Op feeds back and controls the gate voltage of the power output transistor Mn to maintain the power supply voltage Vout unchanged. When the connected load circuit 200 jumps from a heavy load to a light load, because a current provided by the power output transistor Mn is far greater than a load requirement, an excess current may further charge the output capacitor C3, so that the power supply voltage Vout increases (in this case, overshooting of a potential of the power supply voltage Vout occurs), and the feedback voltage Vfb increases. The output end of the operational amplifier Op controls the gate voltage of the power output transistor Mn to increase, and the current provided by the power output transistor Mn to decrease to a load current. On the contrary, when the load jumps from a light load to a heavy load, because a current provided by the power output transistor Mn cannot meet a load requirement, a load current is discharged through the output capacitor C3, so that the power supply voltage Vout decreases (in this case, undershooting of a potential of the power supply voltage Vout occurs), and the feedback voltage Vfb decreases. The output end of the operational amplifier Op controls the gate voltage of the power output transistor Mn to decrease, and the current provided by the power output transistor Mn to increase to the load current.

Optionally, the operational amplifier Op may be a folded cascode operational amplifier, which has lower power consumption and a higher gain, and may separately adjust decoupling of input stage transconductance and an output impedance.

In this embodiment, the power output transistor Mn may be a P-channel field effect transistor. When the gate voltage of the power output transistor Mn increases, a drain voltage of the power output transistor Mn decreases, and when the gate voltage of the power output transistor Mn decreases, the drain voltage of the power output transistor Mn increases.

Optionally, both the first feedback resistor R1 and the second feedback resistor R2 may be a polycrystalline silicon resistor, and precision is higher.

Figure 7:
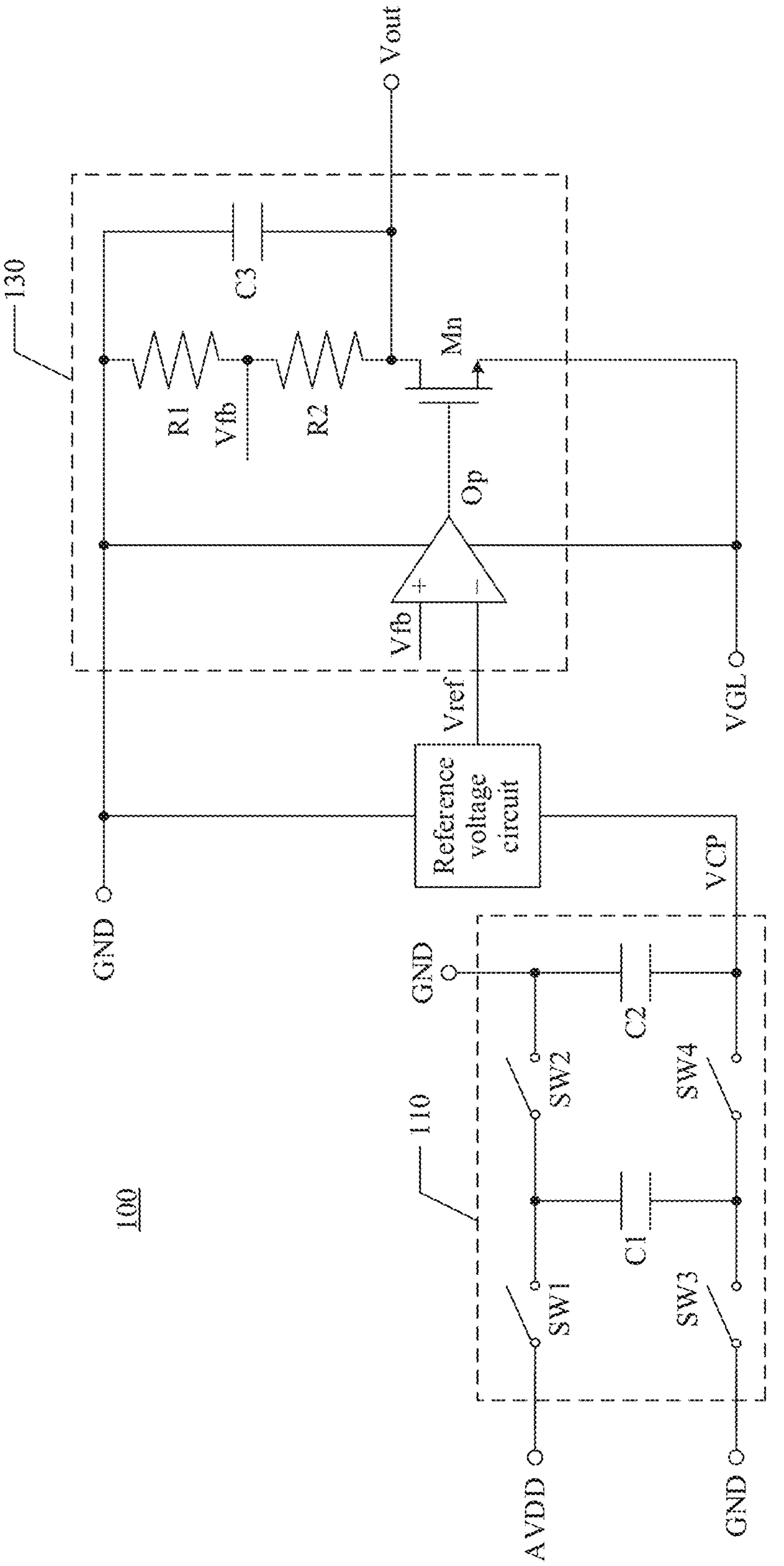
FIG. 7 is a diagram of another structure of a power supply circuit in a source drive chip according to an embodiment.

FIG. 7 is an example of a diagram of another structure of a power supply circuit in a source drive chip according to an embodiment.

As shown in FIG. 7, in the power supply circuit 100 provided, the reference source generation circuit 120 may be a circuit that can generate a reference voltage, like a reference voltage BG circuit.

Figure 8:
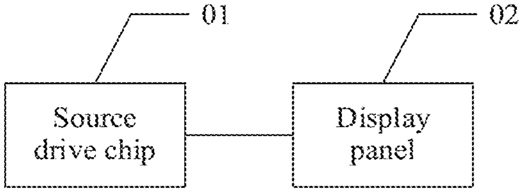
FIG. 8 is a diagram of a structure of a display apparatus according to an embodiment.

FIG. 8 is an example of a diagram of a structure of a display apparatus according to an embodiment.

As shown in FIG. 8, an embodiment further provides a display apparatus. The display apparatus may include the source driver chip 01 and the display panel 02 provided in embodiments. The display panel may be an OLED display panel.

The display apparatus provided in embodiments may be used in various terminal devices, for example, may be used in electronic devices such as a smartphone, a tablet computer, a palmtop computer or PDA. It should be noted that the display apparatus provided in embodiments is intended to include but is not limited to being used in these terminal devices and any terminal device of another proper type.

It is clear that a person skilled in the art may make various modifications and variations to this disclosure without departing from the spirit and scope of this disclosure. Thus, this disclosure is intended to cover such modifications and variations, provided that the modifications and variations fall within the scope of the claims and their equivalent technologies.

The invention claimed is:

1. A source drive chip, comprising:
- a load circuit; and
- a power supply circuit comprising:
  - a charge pump configured to provide a negative voltage level based on an external positive voltage power supply and comprising:
    - a first switch;
    - a second switch;
    - a third switch;
    - a fourth switch;
    - a first on-chip capacitor comprising:
      - a first end configured to couple through the first switch to the external positive voltage power supply; and
      - a second end coupled by the third switch to a ground; and
    - a second on-chip capacitor comprising:
      - a third end coupled in series to the second switch and to the ground; and
      - a fourth end coupled in series with the fourth switch and configured to provide the negative voltage level to the reference source generation circuit;

a reference source generation circuit coupled with the charge pump and configured to provide a reference voltage based on the negative voltage level; and a low-dropout (LDO) regulator coupled to the load circuit and to the reference source generation circuit and configured to output a power supply voltage to the load circuit based on the reference voltage and an external negative voltage power supply.

2. The source drive chip of claim 1, wherein a capacitance value of each of the two on-chip capacitors is less than 10 nanofarads (nF).

3. The source drive chip of claim 1, wherein the LDO regulator comprises:

an operational amplifier comprising:

a positive input configured to receive the reference voltage;

a negative input configured to receive a feedback voltage;

a negative voltage power supply end configured to couple to the external negative voltage power supply;

a positive voltage power supply end connection to a ground; and an output end;

a power output transistor comprising:

a gate coupled to the output end;

a source configured to couple to the external negative voltage power supply; and a drain configured to provide the power supply voltage;

a first feedback resistor;

a second feedback resistor coupled in series with the first feedback resistor, wherein the first feedback resistor and the second feedback resistor are configured to couple the drain to the ground;

a series connection point between the first feedback resistor and the second feedback resistor configured to output the feedback voltage; and an output capacitor comprising:

a fifth end coupled to the drain; and a sixth end configured to couple to the ground.

4. The source drive chip of claim 3, wherein the operational amplifier is a folded cascode operational amplifier configured to separately adjust decoupling of an input stage transconductance and an output impedance.

5. The source drive chip of claim 3, wherein the first feedback resistor and the second feedback resistor are polycrystalline silicon resistors.

6. The source drive chip of claim 1, wherein the reference source generation circuit is a reference voltage circuit.

7. The source drive chip of claim 1, wherein the load circuit comprises a plurality of medium-voltage components, and wherein a withstand voltage of the medium-voltage component is not greater than 8 volts (V).

8. The source drive chip of claim 1, wherein the load circuit is an on-screen initialization voltage power supply system.

9. The source drive chip of claim 1, wherein the power supply voltage is a negative voltage greater than a voltage of the external negative voltage power supply.

10. The source drive chip of claim 1, wherein the power supply voltage is a not less than negative 6 volts (V).

11. A display apparatus, comprising:

a display panel; and a power supply circuit comprising:

a charge pump configured to provide a negative voltage level based on an external positive voltage power supply and comprising:

a first switch;

a second switch;

a third switch;

a fourth switch;

a first on-chip capacitor comprising:

a first end configured to couple through the first switch to the external positive voltage power supply; and a second end coupled by the third switch to a ground; and a second on-chip capacitor comprising:

a third end coupled in series to the second switch and to the ground; and a fourth end coupled in series with the fourth switch and configured to provide the negative voltage level to the reference source generation circuit;

a reference source generation circuit coupled with the charge pump and configured to provide a reference voltage based on the negative voltage level; and a low-dropout (LDO) regulator coupled to the load circuit and to the reference source generation circuit and configured to output a power supply voltage to the load circuit based on the reference voltage and an external negative voltage power supply.

12. The display apparatus of claim 11, wherein the display panel comprises organic light emitting diode (OLED) display.

13. The display apparatus of claim 11, wherein a capacitance value of each of the two on-chip capacitors is less than 10 nanofarads (nF).

14. The display apparatus of claim 11, wherein the LDO regulator comprises:

an operational amplifier comprising:

a positive input configured to receive the reference voltage;

a negative input configured to receive a feedback voltage;

a negative voltage power supply end configured to couple to the external negative voltage power supply;

a positive voltage power supply end connection to ground; and an output end;

a power output transistor comprising:

a gate coupled to the output end;

a source configured to couple to the external negative voltage power supply; and a drain configured to provide the power supply voltage;

a first feedback resistor;

a second feedback resistor coupled in series with the first feedback resistor, wherein the first feedback resistor and the second feedback resistor are configured to couple the drain to the ground;

a series connection point between the first feedback resistor and the second feedback resistor configured to output the feedback voltage; and an output capacitor comprising:

a fifth end coupled to the drain; and a sixth end configured to couple to the ground.

15. The display apparatus of claim 14, wherein the operational amplifier is a folded cascode operational amplifier configured to separately adjust decoupling of input stage transconductance and an output impedance.

16. The display apparatus of claim 14, wherein the first feedback resistor and the second feedback resistor are polycrystalline silicon resistors.

17. The display apparatus of claim 11, wherein the reference source generation circuit is a reference voltage circuit.

18. The display apparatus of claim 11, wherein the display panel comprises a plurality of medium-voltage components, and a withstand voltage of the medium-voltage component is not greater than 8 volts (V).

19. The display apparatus of claim 11, wherein the display panel comprises an on-screen initialization voltage power supply system.

20. The display apparatus of claim 11, wherein the power supply voltage is a negative voltage greater than a voltage of the external negative voltage power supply.

* * * * *